Nov. 6, 1945.   C. H. BATHURST   2,388,380
AIRPLANE CONSTRUCTION
Filed March 11, 1943   2 Sheets-Sheet 2
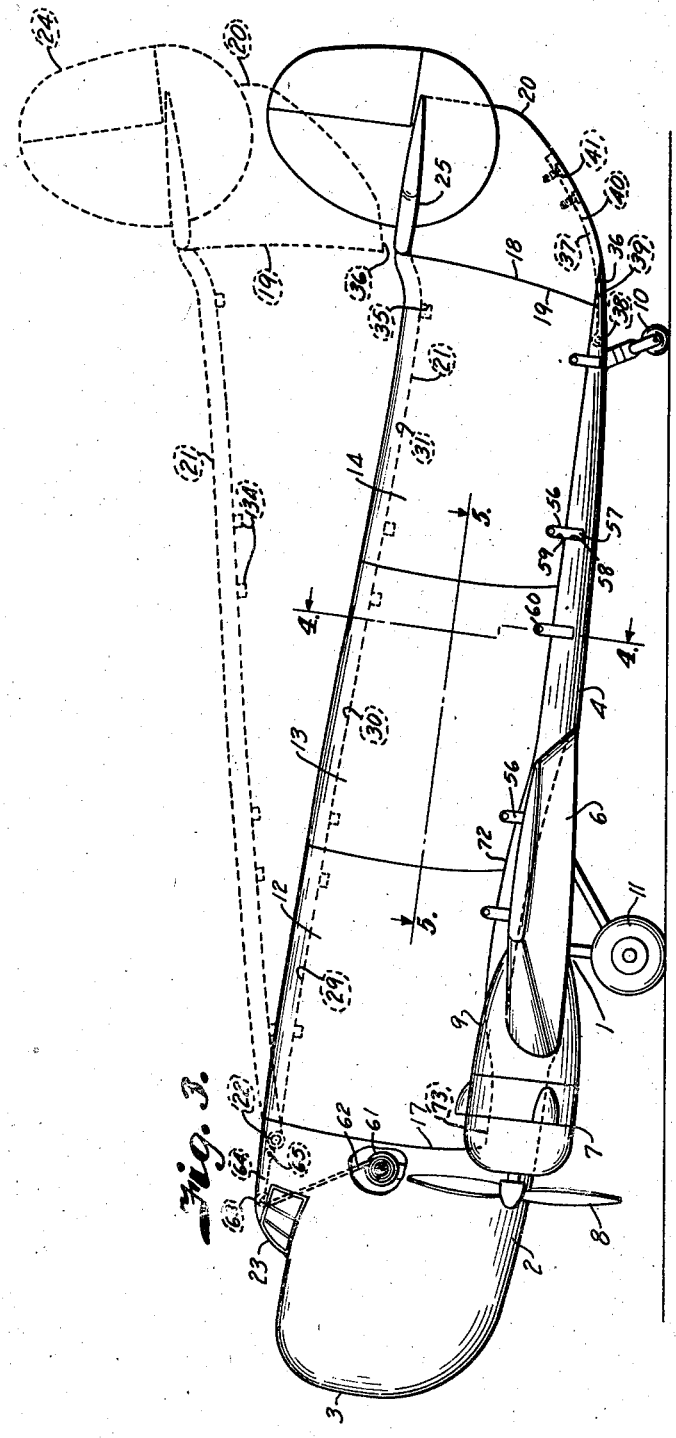
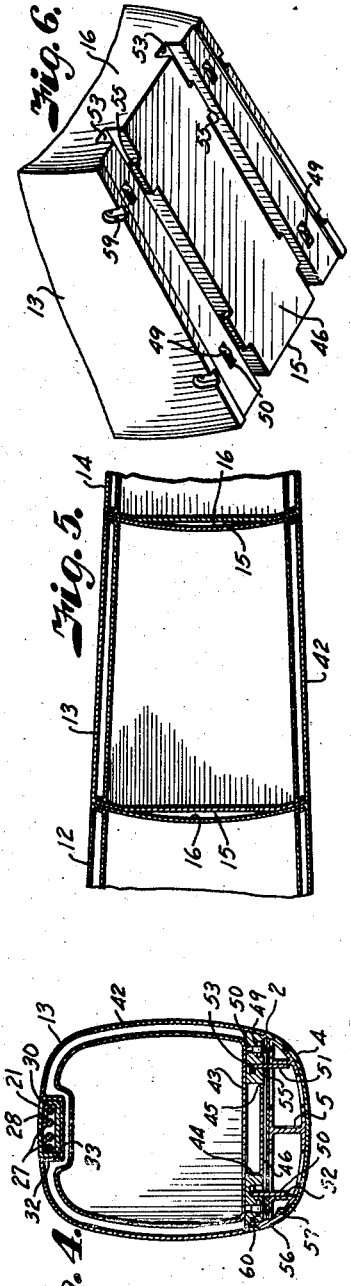
INVENTOR
Cecil H. Bathurst
BY
ATTORNEY Patented Nov. 6, 1945

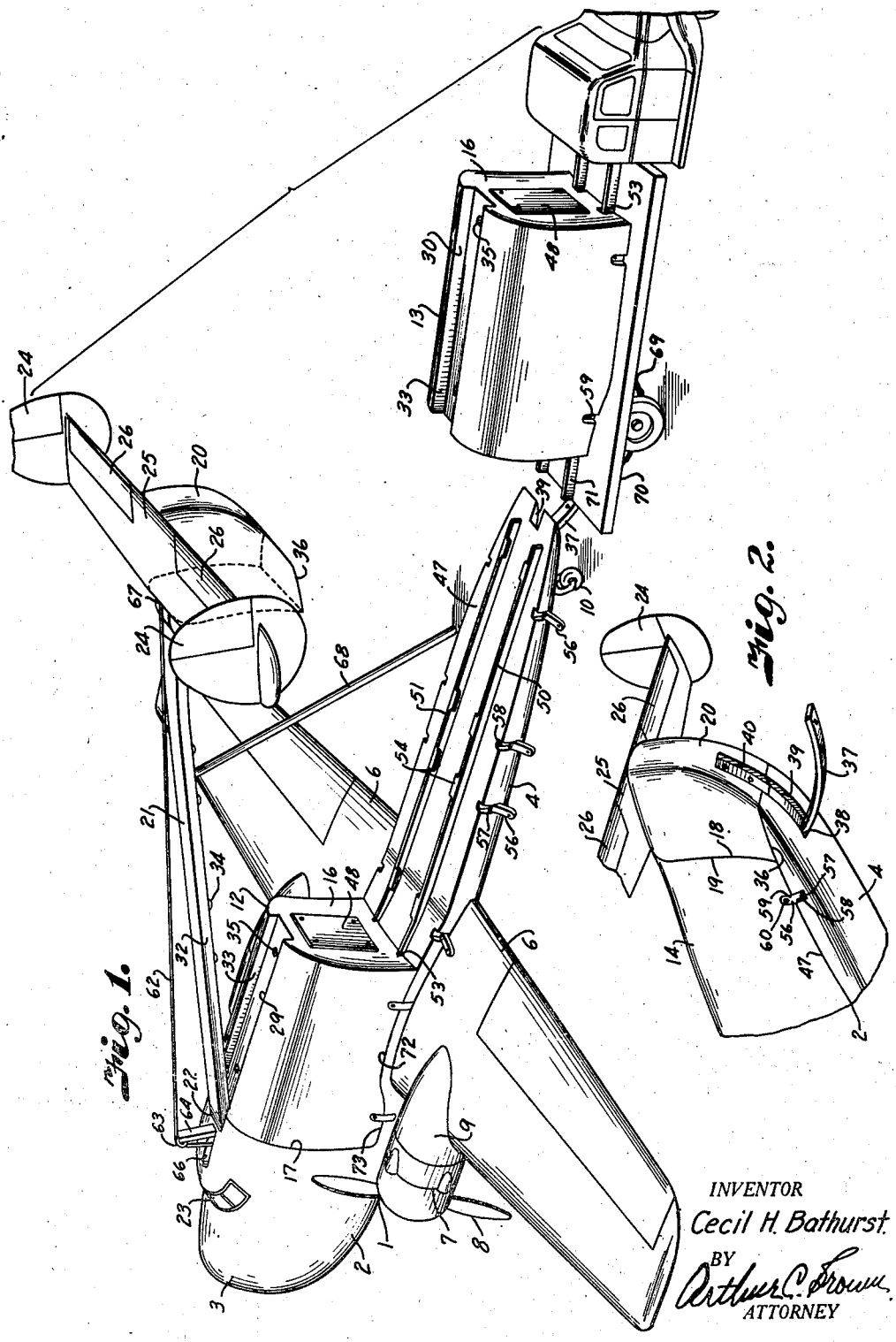

2,388,380

UNITED STATES PATENT OFFICE 2,388,380

AIRPLANE CONSTRUCTION

Cecil H. Bathurst, Merriam, Kans.

Application March 11, 1943, Serial No. 478,749

11 Claims. (Cl. 244—137)

This invention relates to airplane construction and more particularly to an airplane having one or more removable cargo compartments or sections for carrying mail, baggage, or general freight and has for its principal object to provide an airplane structure in which the removable compartments or sections form parts of the fuselage and may be readily connected and disconnected to permit delivery of the cargo some distance from the airport without unloading the respective compartments.

Other objects of the invention are to provide a plane skeleton frame in which the fuselage is formed of removable sections; to provide an airplane having removable sections which may be placed on a truck or the like for delivery at some distance from an air port; to provide a hinged connection between the control cabin and the tail assembly for hinging said tail assembly to an out-of-the-way position to permit the removable sections to be slid rearwardly of the plane for bodily removal from the frame thereof; to provide an airplane structure composed of a unitary nose section and fuselage base together with removable sections and a tail assembly; to provide a rigid beam on the tail assembly for supporting connection with the control compartment; to provide mating recesses in the removable sections for receiving the beam when the fuselage is assembled; to provide cooperating members on the beam compartments and fuselage base for holding the respective parts in assembled streamlined condition; to provide for lifting and supporting the beam and tail assembly to permit removal of the compartments, the beam being capable of acting as a boom for aiding in moving said compartments; to provide mating nesting surfaces on the compartments for aiding in eliminating any movement thereof; to provide tracks and rollers for aiding in moving the compartments on the fuselage base; to provide for enclosing and maintaining the control cables and the like in connected condition at all times to minimize the possibility of errors that might occur were the control members disconnected when the compartments were removed; and to provide a plurality of interchangeable cargo sections whereby one may be removed for delivery at some distance from an airport and another placed on an airplane fuselage base to permit continuance of flight of the plane.

Still further objects of the invention are to provide an improved cargo airplane of conventional shape, of stern, sturdy, durable construction, efficient and of large capacity, yet economical to manufacture and operate; and to provide improved parts and arrangements of parts in the structure of an airplane of this character.

In accomplishing these and other objects of the present invention, I have provided improved details of structure, the preferred form of which is illustrated in the accompanying drawings, wherein:

Fig. 1 is a perspective view of an airplane embodying my invention, particularly showing the position of parts during removal of the cargo compartments, one of the compartments being shown on a truck for delivery to the cargo destination.

Fig. 2 is a bottom perspective view of the tail structure particularly showing a form of connecting member for the tail assembly and the fuselage base.

Fig. 3 is a side elevation of an airplane with the cargo compartments assembled in place, the raised position of the beam and tail assembly being shown in dotted lines.

Fig. 4 is a transverse section through the fuselage on the line 4—4, Fig. 3.

Fig. 5 is a horizontal section through the fuselage on the line 5—5, Fig. 3.

Fig. 6 is a bottom perspective view of one of the removable cargo compartments.

Referring more in detail to the drawings:

1 designates an airplane having a fuselage 2 preferably consisting of a streamlined nose section 3 and an elongated rearwardly extending platform section 4, said platform section 4 being of relatively shallow depth or vertical dimension compared to the total depth of the fuselage and nose section. The platform section of the fuselage is provided with internal members and trussing, as at 5, to provide sufficient strength to carry the stresses to which the conventional fuselage is normally subjected and to provide suitable support for the nose section which is formed as a unitary part thereof. Suitable wings 6 extend outwardly from each side of the fuselage base and are suitably connected thereto to provide a plane of the cabin or the cargo type of preferably low wing monoplane structure, in which the motors 7 and propellors 8 are carried by suitable housings 9 on the wings. While I have shown a low-wing monoplane structure, it is contemplated that a high-wing monoplate structure may be utilized by extending the nose section to suitably mount the wings without departing from the spirit of my invention.

Mounted below the fuselage base adjacent the rear thereof is a tail wheel 10 of the landing gear which cooperates with landing wheels 11 mounted under the wing structure said landing wheels being made retractable so they may be used during landing and retracted during flight, as in conventional practice. Mounted on the platform of the fuselage base are one or more removable cargo sections which in the present instance are shown in three sections 12, 13 and 14. These sections preferably formed with curved front and rear ends 15 and 16 which permit the cargo section 12, for example, to mate and nest with the rear portion 17 of the nose section and all of the respective cargo sections to nest with each other to form a conventionally shaped fuselage which completes the streamlining of the nose section. The rear end of the section 14 is curved as at 18 to mate with the curved portion 19 of a tail member 20 mounted on a beam 21 which is pivotally mounted as at 22 in the rear top portion of the control cabin 23 which is formed as a part of the nose section 3. The tail member 20 completes the streamlining of the fuselage and carries the usual control members forming the tail assembly consisting of vertical fins and rudders 24 and horizontal stabilizers 25 having movable elevators 26. While the tail assembly is illustrated as including two spaced rudders, it is contemplated that any conventional control members may be mounted on the tail member 20, said control members being operated by cables, rods or the like 27 connected to the respective members and extending to the interior 28 of the beam 21. The beam 21 is preferably of rectangular cross-section to provide suitable space for said cables or the like which connect with suitable controls carried in the control cabin.

In order to provide an airplane fuselage of substantially conventional shape, the cargo containers 12, 13 and 14 are provided with aligning grooves 29, 30 and 31, Fig. 3, adapted to receive the beam 21 when the plane is all assembled ready for flight to provide for substantial streamlining of the fuselage, and to provide for anchoring the cargo members against lateral movement by engagement of the sides 32 of the beams with the sides 33 of the respective grooves. The cargo compartments are further anchored against lateral or longitudinal movement by pins or other suitable devices 34 engaging in recesses 35 at the bottom of the grooves of the respective cargo compartments.

When the cargo compartments are in place and with the beam 21 seating in the respective grooves in the cargo compartments, the curved ends of the respective compartments cooperate with the beam, the pins engaging thereon in the recesses, to hold the compartments positively in place. When the beam 21 rests in the grooves in the cargo compartment, the flattened portion 36 on the bottom of the tail member 20 rests on the rear portion of the platform of the fuselage base, and is held in place by a suitable fastening means such as an arm 37 hinged to the lower side of the fuselage base as at 38 and lying in grooves 39 and 40 in the fuselage base in the tail member 20 to provide a streamlined effect therein. The arm 37 is secured to the tail member by means of suitable fastening devices such as screws 41. The fastening of the tail members 20 to the fuselage base not only holds the tail assembly in proper functioning position but also assists in holding the removable cargo compartments in place and provides a rigid skeleton frame construction composed of the nose section 3, the fuselage base 4, the beam 21 and the tail member 20.

The respective cargo compartments are preferably formed of sheet metal walls 42 having suitable trussing therein and a floor structure 43 mounted on floor sills 44 which are enclosed as at 45 to provide a bottom 46 adapted to rest on the top 47 of the fuselage base. The ends of each compartment are preferably provided with fill openings that are normally closed by suitable panels 48 to permit loading and unloading of the respective compartments. In order to assist in moving the respective compartments into place, rollers 49 are preferably mounted in recesses 50 and extend slightly below the surface 46 to engage the surface 47 of the fuselage base to permit rolling of the respective compartments thereon. In order to provide further assurance against lateral movement of the respective compartments tracks 50 and 51 are preferably secured to the bracing in the fuselage base as at 52 and extend above the surface 47 to engage in grooves 53 in the sill members of the compartment. The tracks may be provided with spaced flanges 54 adapted to engage flanges 55 in the grooves 53 to prevent upward movement of the compartment.

Additional fastening devices may be provided to hold the respective compartments in place.

One arrangement of such fastening devices may be suitable arms 56 hingedly mounted as at 57 to the fuselage base and seating in grooves 58 and 59 in the fuselage base and compartment side walls respectively and secured to the compartment by means of suitable fastening devices such as screws 60.

While in well equipped airports and terminals suitable means probably is or could be made available for lifting the tail assembly upwardly on the end 22 of the beam, it is possible that in smaller airports suitable apparatus would not be available. I have, therefore, provided a winch structure 61 in the rear of the nose section to operate a cable or the like 62 adapted to extend over a pulley 63 mounted on an arm 64 hinged as at 65 and adapted to lie in a recess 66 in the top of the control cabin whereby lifting of the arm 64 provides a leverage that permits the cable 62 to be attached to the tail assembly as at 67 and the winch operated to lift the tail assembly and beam from the fuselage base. After the tail assembly has been lifted sufficiently to clear the cargo compartment suitable braces 65 may be placed under the beam to hold same in raised condition and to permit the beam 21 to act as a boom to allow the cable 62 to be attached to the respective cargo compartments. The winch 61 may then be operated to lift same to aid in removal from the track whereby the respective cargo compartments may be moved to the rear of the fuselage base and placed on a suitable truck or the like 69 preferably having a bed 70 on which are tracks 71 corresponding to the tracks 50 and 51 on the fuselage base whereby the cargo compartment may be moved over the tracks 71 and secured in place on the track bed for subsequent delivery to the destination of the cargo at some distance from the airport for unloading.

With this arrangement an airplane may be flown to an airport and a compartment removed for delivery to its destination nearby and another corresponding loaded compartment placed on the fuselage base so the plane may continue its flight to the next destination. It is contemplated that if no loaded compartments are available, a suitable dummy compartment may be mounted in place to complete the streamlining of the fuselage to make the above suitable for travel to the next destination.

While, it is preferable that the fuselage base be flat on its upper surface, in some instances the positioning of the wing structure and the braces therefor in the fuselage base require additional height. Therefore, the fuselage base may be curved as at 72 to span such wing reinforcement and spars. This arrangement causes no difficulty as the beam member 21, winch 58 and line 59 may be used to lift the compartment from the recess 73 formed at the forward end of the wing structure.

When using an apparatus such as described, the respective compartments are taken by truck or the like to the factory or other point of shipment of the goods and loaded. After loading, the compartments are taken to an airport where a plane may be available and by lifting the arm 64 and attaching the cable 62 to the tail assembly of the plane, the beam 21 may be raised to raise the tail assembly above the normal height of the cargo compartment where it is braced in position by the member 68. The truck may then be placed at the end of the fuselage base as shown in Fig. 1 and the line 62 attached thereto to lift a compartment in such a manner that it may be placed on the fuselage base over the tracks 50 and 51 and rolled into position whereby the flanges 54 engage the flanges 55 of the respective compartments to hold some against vertical movement. The arms 56 are then hinged upwardly under the recesses 58 and 59 and secured in place by the fastening devices 66 which also tend to prevent vertical movement. Due to the fact that the arms rest in the recesses, relative longitudinal movement of the plane and cargo compartments is prevented. After the required number of cargo compartments are placed on a fuselage base, the line 62 is attached to the tail assembly and the members 68 are removed to permit operation of the winch 61 to lower the tail assembly and beam into place whereby the pins 34 engage in the recesses 35 and the beam 21 seats in the grooves 29, 30, 31 to hold the respective cargo compartments against longitudinal or lateral movement. The arm 37 is then hinged upwardly into the grooves 39 and 40 and is secured in place by the fastening devices 41 to complete the assembly of the airplane. The fact that all of the control cables to the tail assembly pass through the hollow beam 21 allows all of the control cables intact during the removal and placement of the cargo compartments so that when the tail assembly is secured in place by the arm 37 the airplane is ready for flight. The arm 64 is lowered into place over the control cabin and the motors 7 is started to carry the respective cargo compartments to their destination.

On reaching the destination of the cargo the tail assembly and beam are raised by the winch 61 in the same manner as when loading the plane and the line 62 is used to aid in lowering the compartments from the fuselage base to waiting trucks for the delivery of the cargo to its respective destinations, another compartment being placed on the fuselage base to permit the plane to continue its flight.

It is therefore believed obvious that I have provided a structure in which all the control members remain connected, thereby minimizing the possibility of error in connection of control members. I have also provided an airplane structure having a removable fuselage section which, when on the fuselage base, provides a complete streamlining effect and conventional shape for the airplane. It is also apparent that the structure is sturdy, efficient, of large capacity, yet economical to manufacture and operate.

What I claim and desire to secure by Letters Patent is:

1. In an airplane construction, a nose section forming the forward portion of the fuselage, a fuselage base comprising a platform extending rearwardly of the nose section, a tail assembly including control surfaces, a cargo section removably mounted on the fuselage base, said cargo section having a recess in the upper portion thereof, a beam on the tail assembly hingedly connected to the nose section and adapted to lie in the recess in the upper portion of the cargo section, and means for spacing the tail assembly from the cargo section to permit removal of said cargo section.

2. In an airplane construction, a nose section forming the forward portion of the fuselage, the fuselage base comprising a platform extending rearwardly of the nose section, a tail assembly including control surfaces adapted to be secured to the fuselage base adjacent the end thereof, at least one cargo section removably mounted on the fuselage base, and having end surfaces adapted to nest with the end surfaces of the nose section and tail assembly, said cargo section having a recess in the upper portion thereof, a beam on the tail assembly hingedly connected to the nose section and adapted to lie in the recess in the upper portion of said cargo section, and means including arms carried by the fuselage base for securing the cargo section to said fuselage base.

3. In an airplane construction, a nose section forming the forward portion of the fuselage, a fuselage base comprising a platform extending rearwardly of the nose section, a tail assembly including control surfaces adapted to be secured to the fuselage base adjacent the end thereof, at least one cargo section removably mounted on the fuselage base, said cargo section having a recess in the upper portion thereof, a beam on the tail assembly hingedly connected to the nose section and adapted to lie in the recess in the upper portion of the cargo section and complete the streamlining thereof, and means on the beam engaging the cargo section to hold same in place.

4. In an airplane construction, a nose section forming the forward portion of the fuselage, a fuselage base comprising a platform extending rearwardly of the nose section, a tail assembly including control surfaces adapted to be secured to the fuselage base adjacent the end thereof, at least one cargo section being removably mounted on the fuselage base and having end surfaces adapted to nest with the end surfaces of the nose section and tail assembly, said cargo section having a recess in the upper portion thereof, a beam on the tail assembly hingedly connected to the nose section and adapted to lie in the recess in the cargo section to complete the streamlining thereof and hold same in place, and means for securing the cargo section to the fuselage base.

5. In an airplane construction, a nose section forming the forward portion of the fuselage, the fuselage base comprising a platform extending rearwardly of the nose section, a tail assembly including control surfaces adapted to be secured to the fuselage base adjacent the end thereof, track members mounted on the platform of the fuselage base, at least one cargo section being removably mounted on the fuselage base and having end surfaces adapted to nest with the end surfaces of the nose section and tail assembly, said cargo section having grooves in the lower surface thereof adapted to slidably engage the track members on the platform of the fuselage base, and means for securing the cargo section to the fuselage base.

6. In an airplane construction, a nose section forming the forward portion of the fuselage, a fuselage base comprising a platform extending rearwardly of the nose section, a tail assembly including control surfaces adapted to be secured to the fuselage base adjacent the end thereof, track members mounted on the platform of the fuselage base, at least one cargo section being removably mounted on the fuselage base and having end surfaces adapted to nest with the end surfaces of the nose section and tail assembly, said cargo section having grooves in the lower surface thereof adapted to slidably engage the track members on the platform of the fuselage base, said cargo section having a recess in the upper portion thereof, a beam on the tail assembly hingedly connected to the nose section and adapted to lie in the recess in the upper portion of the cargo section and complete the streamlining thereof, means on the beam engaging the cargo section to hold same in place, and means for securing the cargo section to the fuselage base.

7. In an airplane construction, a fuselage base comprising an elongated platform, a nose section including a control cabin on the forward end of the fuselage base extending substantially above the base, main supporting wings including motors secured to and extending outwardly from the fuselage base, at least one cargo section removably mounted on the fuselage base forming a portion of the fuselage of the airplane and mating with the nose section to complete the streamlining thereof, a tail assembly including control surfaces mating with the rear of the cargo section to complete the streamlining thereof, a beam member on the tail assembly hingedly connected to the nose section to permit raising of the tail assembly above the cargo section, and means for connecting the tail assembly to the fuselage base.

8. In an airplane construction, a nose section forming the forward portion of the fuselage, a fuselage base comprising a platform extending rearwardly of the nose section, wings including motors secured to and extending outwardly of the fuselage, a tail assembly including elevator and rudder members, a beam connected to the tail assembly and hingedly mounted on the nose section, control members for operating the elevator and rudder members extending through the beam, a cargo section removably mounted on the fuselage base and having a recess on the top thereof for receiving the beam when the respective parts are assembled in place, and means for connecting the tail assembly to the fuselage base.

9. In an airplane construction, a nose section forming the forward portion of the fuselage, a fuselage base comprising a platform extending rearwardly of the nose section, a tail assembly including control surfaces adapted to be secured to fuselage base engaged with the end thereof, track members mounted on the platform of the fuselage base, at least one cargo section being removably mounted on the fuselage base and having end surfaces adapted to nest with the end surfaces of the nose section and tail assembly, said cargo section having grooves in the lower surface thereof adapted to slidably engage the track members on the platform of the fuselage base, said cargo section having a recess in the upper portion thereof, a beam on the tail assembly hingedly connected to the nose section and adapted to lie in the recess in the cargo section and complete the streamlining thereof, means on the beam engaging the cargo section to hold same in place, control surface operating means extending through the beam from the nose section to the tail assembly, and means for securing the cargo section to the fuselage base.

10. In an airplane construction, a nose section forming the forward portion of the fuselage, a fuselage base comprising a platform extending rearwardly of the nose section, a tail assembly including control surfaces adapted to be secured to the fuselage base near the end thereof, a cargo section removably mounted on the fuselage base, said cargo section having a recess in the upper portion thereof, a beam on the tail assembly hingedly connected to the nose section and adapted to lie in the recess in the upper portion of the cargo section, and means for spacing the tail assembly from the cargo section to permit removal of said cargo section.

11. In an airplane construction, a nose section forming the forward portion of the fuselage, a fuselage base comprising a platform extending rearwardly of the nose section, a tail assembly including control surfaces, a cargo section removably mounted on the fuselage base, said cargo section having a recess in the upper portion thereof, a beam on the tail assembly hingedly connected to the nose section and adapted to lie in the recess in the upper portion of the cargo section, and means including a pulley mounting and winch for raising the tail assembly above the cargo section to permit removal of said cargo section.

CECIL H. BATHURST.